(12) United States Patent
Mochimaru et al.

(10) Patent No.: US 11,208,126 B2
(45) Date of Patent: Dec. 28, 2021

(54) DC FEEDER VOLTAGE COMPUTING DEVICE, DC FEEDER VOLTAGE CONTROL SYSTEM, AND DC FEEDER VOLTAGE COMPUTATION METHOD

(71) Applicant: Mitsubishi Electric Corporation, Tokyo (JP)

(72) Inventors: Hironori Mochimaru, Tokyo (JP); Keiki Fujita, Tokyo (JP); Kenji Ueda, Tokyo (JP); Toshihiro Wada, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 216 days.

(21) Appl. No.: 16/603,626

(22) PCT Filed: Jun. 7, 2017

(86) PCT No.: PCT/JP2017/021166
§ 371 (c)(1),
(2) Date: Oct. 8, 2019

(87) PCT Pub. No.: WO2018/225194
PCT Pub. Date: Dec. 13, 2018

(65) Prior Publication Data
US 2021/0086803 A1 Mar. 25, 2021

(51) Int. Cl.
*B61L 3/00* (2006.01)

(52) U.S. Cl.
CPC .................................. *B61L 3/006* (2013.01)

(58) Field of Classification Search
CPC ......... B61L 3/006; B61L 25/025; B60L 50/53
See application file for complete search history.

(56) References Cited

U.S. PATENT DOCUMENTS

| 7,715,958 B2 * | 5/2010 | Kumar | B60L 50/53 |
| | | | 701/22 |
| 2015/0027838 A1 * | 1/2015 | Ueda | B60M 3/02 |
| | | | 191/6 |
| 2019/0016356 A1 * | 1/2019 | Mochimaru | B61L 25/025 |

FOREIGN PATENT DOCUMENTS

| JP | 2013132980 A | 7/2013 |
| JP | 2013230775 A | 11/2013 |
| JP | 2014118110 A | 6/2014 |

OTHER PUBLICATIONS

International Search Report (PCT/ISA/210) dated Sep. 12, 2017, by the Japan Patent Office as the International Searching Authority for International Application No. PCT/JP2017/021166.

* cited by examiner

*Primary Examiner* — Thomas G Black
*Assistant Examiner* — Tarek Elarabi
(74) *Attorney, Agent, or Firm* — Buchanan Ingersoll & Rooney PC

(57) ABSTRACT

A DC feeder voltage computing device includes a model information storing unit, a run history information storing unit, and a voltage setting value computing unit. The model information storing unit stores model information. The run history information storing unit stores, on a per train basis, run history information that indicates locations and power situations of a plurality of trains that run in a DC-electrified section on or before a preceding day. The voltage setting value computing unit computes, on the basis of the model information and the run history information, a voltage setting value for controlling a substation voltage to cause an amount of power consumption in the DC-electrified section to satisfy a preset condition.

12 Claims, 7 Drawing Sheets

FIG.4

| DAY TYPE [WEEKDAY], SEASON [SUMMER], TIME SECTION [00:00-01:00] | | | | |
|---|---|---|---|---|
| TIME | TRAIN ID | DIRECTION | LOCATION | POWER |
| 00:00:00 | T1001 | DOWNBOUND | 1.000km | 2000kW |
| 00:00:00 | T1002 | UPBOUND | 19.000km | -1000kW |
| ⋮ | ⋮ | ⋮ | ⋮ | ⋮ |
| 00:59:59 | T1001 | DOWNBOUND | 19.000km | -1000kW |
| 01:00:00 | T1001 | UPBOUND | 1.000km | 2000kW |
| ⋮ | ⋮ | ⋮ | ⋮ | ⋮ |

FIG.5

| TRAIN ID [T1001] | | | | |
|---|---|---|---|---|
| TIME | DIRECTION | LOCATION | POWER | SITUATION |
| 00:00:00 | DOWNBOUND | 1.000km | 2000kW | DAY TYPE [WEEKDAY], SEASON [SUMMER] |
| 00:00:01 | DOWNBOUND | 1.728km | 1800kW | DAY TYPE [WEEKDAY], SEASON [SUMMER] |
| ⋮ | ⋮ | ⋮ | ⋮ | ⋮ |
| 00:59:59 | DOWNBOUND | 18.798km | -1000kW | DAY TYPE [WEEKDAY], SEASON [SUMMER] |
| 01:00:00 | DOWNBOUND | 19.000km | 100kW | DAY TYPE [WEEKDAY], SEASON [SUMMER] |
| ⋮ | ⋮ | ⋮ | ⋮ | ⋮ |

| DAY TYPE | SEASON | TIME SECTION |
|---|---|---|
| WEEKDAY | SUMMER | 00:00-01:00 |
| WEEKDAY | SUMMER | 01:00-02:00 |
| ⋮ | ⋮ | ⋮ |
| WEEKDAY | SUMMER | 23:00-24:00 |

62

| DAY TYPE | SEASON | TIME SECTION | VOLTAGE SETTING VALUE |
|---|---|---|---|
| WEEKDAY | SUMMER | 00:00-01:00 | Vs1:1500V<br>Vs2:1510V<br>...<br>Vsn:1490V |
| ⋮ | ⋮ | ⋮ | ⋮ |
| WEEKDAY | SUMMER | 23:00-24:00 | Vs1:1550V<br>Vs2:1550V<br>...<br>Vsn:1540V |
| WEEKDAY | WINTER | 00:00-01:00 | Vs1:1520V<br>Vs2:1530V<br>...<br>Vsn:1510V |
| ⋮ | ⋮ | ⋮ | ⋮ |
| WEEKDAY | WINTER | 23:00-24:00 | Vs1:1570V<br>Vs2:1570V<br>...<br>Vsn:1550V |
| HOLIDAY | SUMMER | 00:00-01:00 | Vs1:1460V<br>Vs2:1470V<br>...<br>Vsn:1450V |
| ⋮ | ⋮ | ⋮ | ⋮ |

DC FEEDER VOLTAGE COMPUTING DEVICE, DC FEEDER VOLTAGE CONTROL SYSTEM, AND DC FEEDER VOLTAGE COMPUTATION METHOD

FIELD

The present invention relates to a direct current (DC) feeder voltage computing device, a DC feeder voltage control system, and a DC feeder voltage computation method, for computing an electric power substation (hereinafter referred to simply as substation) voltage, which is a voltage applied from a substation to a feeder line in a DC-electrified section of an electric railway system.

BACKGROUND

In recent years, extensive research and development have been carried out for effectively utilizing regenerative electrical power (hereinafter referred to simply as power) generated by a regenerative brake provided in a train for purposes such as energy saving. Patent Literature 1 proposes a technology of providing a train service on the basis of the amount of power consumption factoring thereinto the regenerative power in a DC-electrified section to effectively utilize the regenerative power in the DC-electrified section.

CITATION LIST

Patent Literature

Patent Literature 1: Japanese Patent Application Laid-open No. 2013-132980

SUMMARY

Technical Problem

However, the above conventional technology reduces the amount of power consumption by controlling the running speed, acceleration, or deceleration of the train, and may thus fail to appropriately reduce the amount of power consumption in a DC-electrified section in a situation where the train operation is difficult to control.

The present invention has been made in view of the foregoing, and it is an object of the present invention to provide a DC feeder voltage computing device capable of reducing the amount of power consumption in a DC-electrified section.

Solution to Problem

To solve the problem and achieve the object described above, a DC feeder voltage computing device according to an aspect of the present invention is a DC feeder voltage computing device for computing a substation voltage that is a voltage applied from a substation to a feeder line in a DC-electrified section of an electric railway system, and the DC feeder voltage computing device includes a model information storing unit, a run history information storing unit, and a voltage setting value computing unit. The model information storing unit stores model information including train model information including information for controlling an amount of regenerative power reduction in a train present in the DC-electrified section, feed network model information including location information on the substation, and substation model information including control information on the substation voltage. The run history information storing unit stores, on a per train basis, run history information that indicates locations and power situations of a plurality of trains that run in the DC-electrified section on or before a preceding day. The voltage setting value computing unit computes, on the basis of the model information and the run history information, a voltage setting value for controlling the substation voltage to cause an amount of power consumption in the DC-electrified section to satisfy a preset condition.

Advantageous Effects of Invention

The present invention provides an advantage in that a reduction can be achieved in the amount of power consumption in a DC-electrified section.

BRIEF DESCRIPTION OF DRAWINGS

FIG. 4 is a diagram illustrating an example of run history information table according to the first embodiment.

FIG. 5 is a diagram illustrating another example of the run history information table according to the first embodiment.

DESCRIPTION OF EMBODIMENTS

A DC feeder voltage computing device, a DC feeder voltage control system, and a DC feeder voltage computation method according to embodiments of the present invention will be described in detail below with reference to the drawings. Note that the embodiments are not intended to limit the scope of this invention.

First Embodiment

Figure 1:
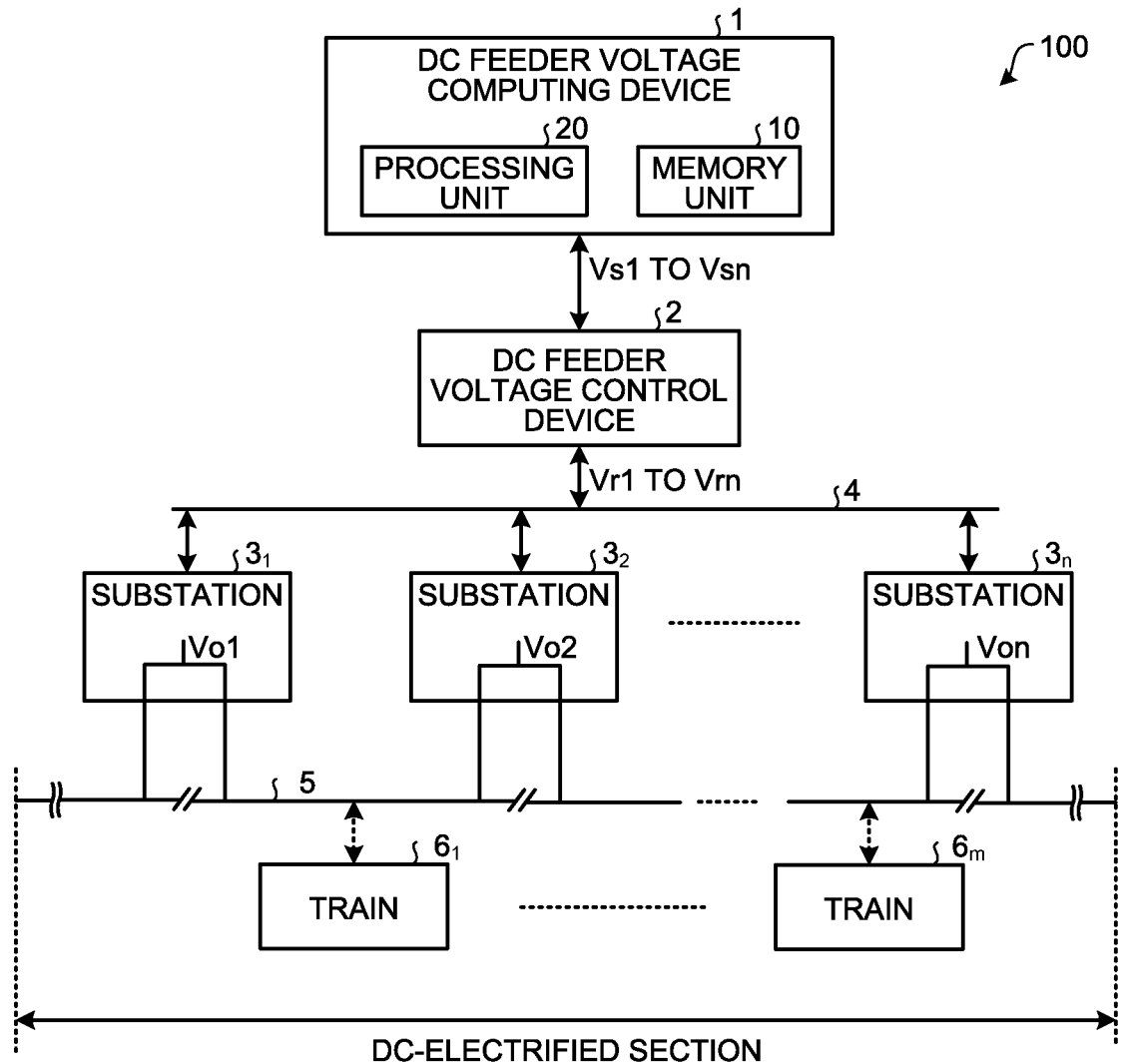
FIG. 1 is a diagram illustrating an example configuration of a DC feeder voltage control system according to a first embodiment.

FIG. 1 is a diagram illustrating an example configuration of a DC feeder voltage control system according to a first embodiment of the present invention. As illustrated in FIG. 1, a DC feeder voltage control system 100 according to the first embodiment includes a DC feeder voltage computing device 1 and a DC feeder voltage control device 2.

The DC feeder voltage computing device 1 computes, every unit time TA, voltage setting values Vs1 to Vsn, which are setting values of substation voltages Vo1 to Von. The substation voltages Vo1 to Von are DC voltages respectively applied from substations $3_1$ to $3_n$ to a feeder line 5 in a DC-electrified section of an electric railway system, and are each also referred to as feeder voltage.

The substation voltages Vo1 to Von are applied to connection points between the respective substations $3_1$ to $3_n$ and the feeder line 5. The substation voltages Vo1 to Von are only needed to enable the voltage on the feeder line 5 to be controlled, and can be any voltage that enables the voltage at the connection point between the substation 3 and the feeder line 5 to be controlled in the end.

The DC feeder voltage control device 2 generates voltage commands Vr1 to Vrn respectively containing the voltage setting values Vs1 to Vsn computed by the DC feeder voltage computing device 1, and outputs the generated voltage commands Vr1 to Vrn respectively to the substations $3_1$ to $3_n$ via a network 4.

The substations $3_1$ to $3_n$ respectively apply the substation voltages Vo1 to Von having the voltage setting values Vs1 to Vsn to the feeder line 5, on the basis of the voltage setting values Vs1 to Vsn contained in the voltage commands Vr1 to Vrn. Specifically, the substation $3_1$ applies the substation voltage Vo1 having the voltage setting value Vs1 to the feeder line 5; the substation $3_2$ applies the substation voltage Vo2 having the voltage setting value Vs2 to the feeder line 5; and the substation $3_n$ applies the substation voltage Von having the voltage setting value Vsn to the feeder line 5.

Thus, the DC feeder voltage control system 100 is a system that controls the substation voltages Vo1 to Von applied to the feeder line 5 in a DC-electrified section of an electric railway system. As used herein, the substations $3_1$ to $3_n$ may be collectively or individually referred to as "substation(s) 3"; the substation voltages Vo1 to Von may be collectively or individually referred to as "substation voltage(s) Vo"; the voltage setting values Vs1 to Vsn may be collectively or individually referred to as "voltage setting value(s) Vs"; and the voltage commands Vr1 to Vrn may be collectively or individually referred to as "voltage command(s) Vr".

Trains $6_1$ to $6_m$ running in the DC-electrified section run in power running on electrical power supplied from the feeder line 5. The trains $6_1$ to $6_m$ can also each regenerate power by a regenerative brake during braking, and thus supply the regenerative power to the feeder line 5. As used herein, the trains $6_1$ to $6_m$ may be collectively or individually referred to as "train(s) 6".

As used herein, a train currently in power regeneration is referred to as "regenerative train"; the maximum regenerative power that can be regenerated without regenerative power reduction control, generated by a regenerative brake, is referred to as "regenerable power"; and a current supplied from a regenerative train to an overhead contact line under a regenerable power condition is referred to as "regenerable current". In addition, power that can be supplied back to an overhead contact line under regenerative power reduction control is referred to as "regenerative power", and a current supplied to an overhead contact line under regenerative power reduction control is referred to as "regenerative current".

Regenerative power generated in a regenerative train is supplied to a train being in power running through an overhead contact line. A train being in power running is hereinafter referred to as "power-running train", and the power required for power running of a train is hereinafter referred to as "power-running power".

Low power-running power relative to the regenerative power results in excess of regenerative power, and thus causes the feeder line 5 to have an excessively high voltage. To prevent an excessively high voltage of the feeder line 5, the train 6 provides regeneration reduction control to stop partially or entirely supplying of the regenerative power generated by a regenerative brake to the feeder line 5.

Figure 2:
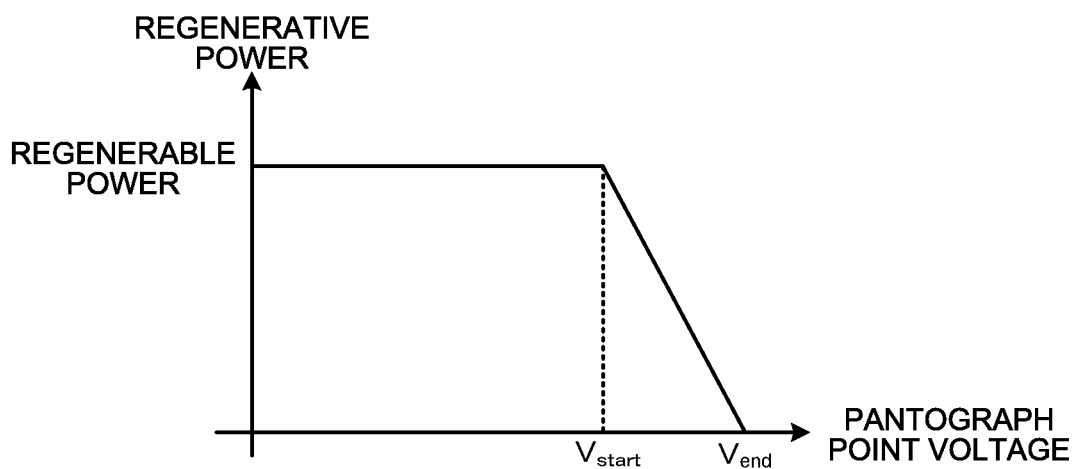
FIG. 2 is a diagram illustrating an example of regeneration reduction control in a regenerative train according to the first embodiment.

The regeneration reduction control is provided based on a pantograph point voltage, which is the voltage at the point where the pantograph of the train 6 is in contact with the overhead contact line connected to the feeder line 5. FIG. 2 is a diagram illustrating an example of regeneration reduction control provided in a regenerative train. The horizontal axis represents the pantograph point voltage, and the vertical axis represents the regenerative power. The regenerative power is a product of the pantograph point voltage and the regenerative current.

Supply of a regenerative current, i.e., regenerative power, from a regenerative train to the overhead contact line raises the pantograph point voltage. When the pantograph point voltage is less than a regeneration reduction starting voltage value $V_{start}$ illustrated in the figure, the regenerative train supplies the regenerable power, which is the maximum regenerable power, to the overhead contact line, but when the pantograph point voltage is at or above the regeneration reduction starting voltage value $V_{start}$, the regenerative train provides regeneration reduction control, which is control to reduce the amount of regenerative power supplied back to the overhead contact line.

Note that, generally in a DC-electrified section of a 1500 V system, the regeneration reduction starting voltage value $V_{start}$ is set in a range, for example, approximately from about 1650 V to about 1780 V, and a regeneration reduction termination voltage value $V_{end}$ is set in a range, for example, approximately from about 1700 V to about 1800 V. A regenerative train present in such DC-electrified section provides regeneration reduction control such that a higher pantograph point voltage undergoes a higher degree of regeneration reduction in a voltage range from the regeneration reduction starting voltage value $V_{start}$ to the regeneration reduction termination voltage value $V_{end}$.

Performing of such regeneration reduction control will cause a part of the regenerative power to be wastefully consumed in the regenerative train due to what is called regeneration cancellation, which prevents the consumed regenerative power from being effectively used as power-running power. Accordingly, the DC feeder voltage control system 100 allows the DC feeder voltage computing device 1 to compute the voltage setting values Vs1 to Vsn to effectively utilize the regenerative power to reduce the amount of power consumption in the DC-electrified section.

The DC feeder voltage control device 2 controls the substations $3_1$ to $3_n$ to cause the substation voltages Vo1 to Von respectively having the voltage setting values Vs1 to Vsn computed by the DC feeder voltage computing device 1 to be applied to the feeder line 5. This operation allows the substation voltages Vo1 to Von to be controlled such that the amount of power consumption in the DC-electrified section is reduced.

The train 6 is a train controlled by a wireless train control system called communications-based train control (CBTC). Thus, it may be possible to collect train information indicating the location and the power value of each of the trains 6 using wireless communication in real time, and to control the substation voltages Vo1 to Von in real time on the basis of the train information collected.

This operation requires a communication time for collecting train information from each of the trains 6, and a computation time for computing the voltage setting values Vs1 to Vsn, i.e., the optimum values of the substation voltages Vo1 to Von. Thus, real-time control of the substation voltages Vo1 to Von using the train information collected from each of the trains 6 suffers from a control delay due to the communication time and the computation time, which may prevent a sufficient energy-saving effect from being achieved. Even an estimate computation that takes into account the communication time and the computation time to compute the voltage setting values Vs1 to Vsn has difficulties in making an estimation with high accuracy, which may also prevent a sufficient energy-saving effect from being achieved.

Thus, the DC feeder voltage computing device 1 computes the voltage setting values Vs1 to Vsn optimum for the amount of power consumption in the DC-electrified section to satisfy a preset condition, on the basis of run history information that indicates the locations and the power situations of the multiple trains 6 that ran in the DC-electrified section on or before the preceding day. This operation can prevent a loss caused by a control delay and can thus improve the energy-saving effect, as compared to when train information is collected in real time to control the substation voltages Vo1 to Von in real time.

As illustrated in FIG. 1, the DC feeder voltage computing device 1 includes a memory unit 10 and a processing unit 20. The memory unit 10 stores model information and run history information for each of the trains 6. The model information includes train model information including information for use in the regeneration reduction control by the trains 6; feed network model information including location information on the substations 3; and substation model information including control information indicating the control ranges of the substation voltages Vo.

The run history information includes information that indicates the locations and the power situations of the trains 6 that ran on or before the preceding day. Information indicating the power situation of each of the trains 6 includes information on the power-running power, the regenerative power, and auxiliary device power of each of the trains 6.

The processing unit 20 performs a power simulation while repeatedly changing the values of the substation voltages Vo1 to Von so that the regenerative power will increase in the regenerative train present in the DC-electrified section, on the basis of the model information and the run history information stored in the memory unit 10.

The processing unit 20 computes, as the voltage setting values Vs1 to Vsn, the values of the substation voltages Vo1 to Von, which are respectively applied from the substations $3_1$ to $3_n$ to the feeder line 5 and which together minimize the amount of the total power consumption, among the sets of the substation voltages Vo1 to Von used in computation of the power simulation performed repeatedly.

Thus, the processing unit 20 can compute the voltage setting values Vs1 to Vsn suitable for the running situation of the train 6. As used herein, the phrase "running situation of the train 6" refers to a situation that affects the run of the train 6, including factors such as the time section of the day (or simply, time section), the day of the week, the season, and the weather when the train 6 is running. Such situation includes social environment and natural environment. The processing unit 20 is capable of computing the voltage setting values Vs1 to Vsn in each situation, and outputting these voltage setting values Vs1 to Vsn to the DC feeder voltage control device 2.

The processing unit 20 acquires the voltage setting values Vs1 to Vsn in each situation computed by the DC feeder voltage computing device 1, and stores these voltage setting values Vs1 to Vsn in the memory unit 10. The processing unit 20 outputs, to the DC feeder voltage control device 2, voltage setting information indicating a set of the voltage setting values Vs1 to Vsn of a situation identical or similar to the current situation, among sets of the voltage setting values Vs1 to Vsn of respective situations stored in the memory unit 10. The DC feeder voltage control device 2 generates the voltage commands Vr1 to Vrn respectively containing the voltage setting values Vs1 to Vsn, and outputs the generated voltage commands Vr1 to Vrn respectively to the substations $3_1$ to $3_n$ via the network 4.

As described above, the DC feeder voltage computing device 1 computes, in advance, the voltage setting values Vs1 to Vsn suitable for the running situation of the train 6. This operation enables the substation voltages Vo1 to Von to be suitably controlled depending on the running situation of the train 6, and thus enables the energy-saving effect to be further improved. A configuration and an operation of the DC feeder voltage computing device 1 will be described in more detail below.

Figure 3:
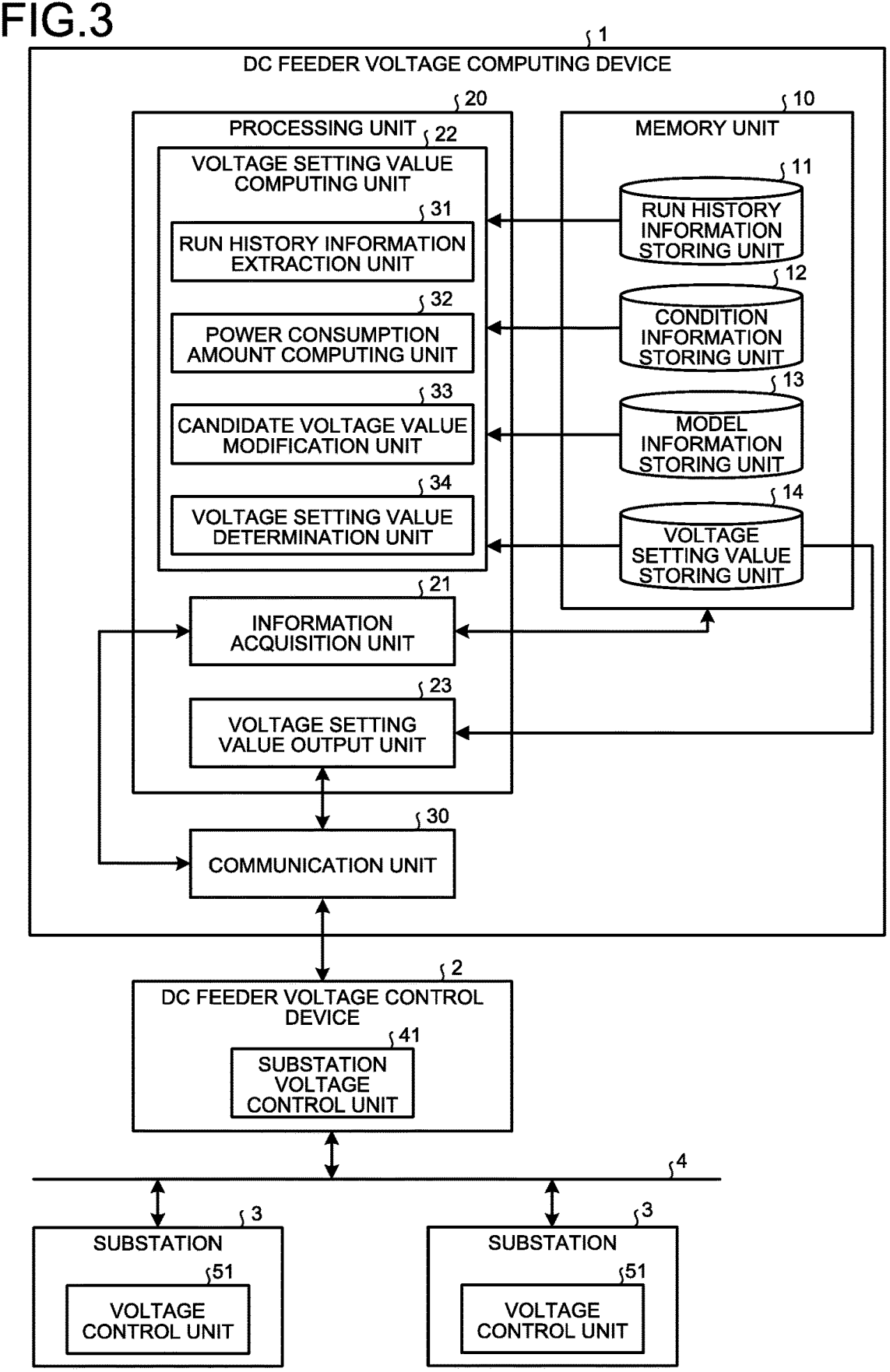
FIG. 3 is a diagram illustrating an example configuration of the DC feeder voltage computing device according to the first embodiment.

FIG. 3 is a diagram illustrating an example configuration of the DC feeder voltage computing device 1. As illustrated in FIG. 3, the DC feeder voltage computing device 1 includes a communication unit 30 in addition to the memory unit 10 and the processing unit 20 described above. The communication unit 30 exchanges information with the DC feeder voltage control device 2 via a network by wire or wirelessly. Note that the communication unit 30 is capable of exchanging information with an onboard device (not illustrated) having a wireless communication unit, disposed on the train 6.

The memory unit 10 includes a run history information storing unit 11, a condition information storing unit 12, a model information storing unit 13, and a voltage setting value storing unit 14. The run history information storing unit 11 stores run history information on each of the multiple trains $6_1$ to $6_m$ on or before the preceding day. This run history information on the trains $6_1$ to $6_m$ is set forth in multiple run history information tables on a per situation basis. The run history information on each of the trains 6 includes information on the location and on the power value of that train 6 at each time of day.

FIG. 4 is a diagram illustrating an example of a run history information table 61 stored in the run history information storing unit 11. Such run history information table 61 is stored in the run history information storing unit 11 on a per situation basis. The run history information table 61 contains run history information that is grouped on the basis of three situational factors: "day type", "season", and "time section". The situational factors are factors used as the basis for grouping the running situations of the trains 6 from different viewpoints, and values thereof are set as situational parameters.

The run history information table 61 illustrated in FIG. 4 contains run history information grouped on the basis of the three situational parameters in which the day type is "weekday", the season is "summer", and the time section is "0 o'clock to 1 o'clock". That is, the run history information table 61 illustrated in FIG. 4 contains run history information on the multiple trains 6 from 0 o'clock to 1 o'clock on a summer weekday in the past. Note that although FIG. 4 does not illustrate information on the dates and times of runs, i.e., the dates and times when the trains 6 ran, the run history information table 61 contains information on the dates and times of runs of the trains 6.

The run history information set forth in the run history information table 61 illustrated in FIG. 4 is information in which "time", "train ID", "direction", "location", and "power" values are associated with one another. The "time" information is information on the time of a run of the train 6 in the past. The "train ID" information is information on identification uniquely assigned to each of the trains 6. The "direction" information is information indicating the travel direction of the train 6, and has values of either "upbound" or "downbound".

The "location" information is information indicating the location of the train 6 in the DC-electrified section, that is, information indicating the location of the train 6 relative to, for example, a start point being one end of the DC-electrified section. The "power" information is information indicating the power value of the train 6. A positive "power" value indicates that the power of the train 6 is power-running power, and a negative "power" value indicates that the power of the train 6 is the regenerable power described above. Note that a "power" value can include, in addition to the values of power-running power and of regenerable power, the value of power consumed by an auxiliary device on the train 6.

The run history information table 61 illustrated in FIG. 4 has been obtained by grouping run history information on the basis of three situational parameters of "day type", "season", and "time section", but the situational parameters for grouping the run history information is not limited to "day type", "season", and "time section". For example, the situational parameters may include information on situational factors such as air temperature, humidity, and disaster. The weather type includes sunny, cloudy, rainy, storm, thunder, and snow. The disaster type includes earthquake, fire, and flood.

In addition, the multiple situational parameters may include information used for grouping of situations of social environment, such as whether there is any event planned along the running line of the train 6, and the type, the opening hours, and the scale of a planned event. The event type includes concert, sport event, flea market, fashion show, marathon, festival, and other events.

Although the "day type" information illustrated in FIG. 4 is information that indicates either weekday or holiday, the day type may be information indicating the day of the week. The situational parameters may include "month" indicating one of the months from January to December in place of "season".

As described above, the run history information storing unit 11 stores the run history information table 61 for each set of situational information including one or more situational parameters. However, the run history information storing unit 11 may store the run history information table 61 containing run history information and situational information associated with each other on a per train 6 basis. FIG. 5 is a diagram illustrating another example of the run history information table stored in the run history information storing unit 11.

The run history information table 61 illustrated in FIG. 5 contains run history information and situational information on the train 6 having a train ID of T1001, and contains information in which "time", "direction", "location", "power", and "situation" values are associated with one another. The "time", "direction", "location", and "power" columns illustrated in FIG. 5 provide the same types of information respectively as the "time", "direction", "location", and "power" columns of the run history information table 61 illustrated in FIG. 4. The "situation" information illustrated in FIG. 5 includes information on the situational parameters representing one or more situational factors described above.

Figures 6, 7:
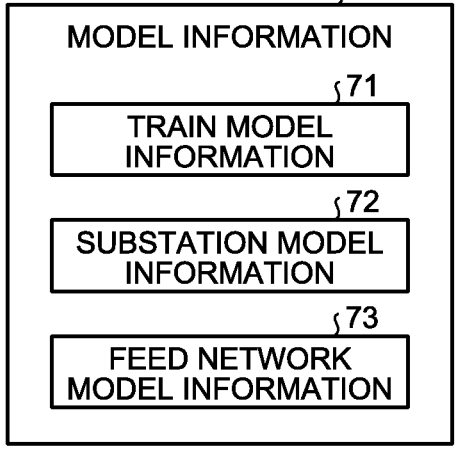
FIG. 6 is a diagram illustrating an example of condition information table according to the first embodiment.
FIG. 7 is a diagram illustrating an example of model information according to the first embodiment.

Referring back to FIG. 3, the description of the memory unit 10 will be continued. The condition information storing unit 12 of the memory unit 10 stores condition information that provides situation conditions for use in computation of power simulation performed by the processing unit 20. FIG. 6 is a diagram illustrating an example of a condition information table 62 stored in the condition information storing unit 12.

The condition information table 62 illustrated in FIG. 6 contains information in which "day type", "season", and "time section" values are associated with one another. The "day type" information is information to distinguish weekday and holiday. The "season" information is information to distinguish spring, summer, fall, and winter. The "time section" information is information to distinguish time sections of the day, more specifically, hourly time sections. Note that the "time section" information may be a time section in p-minute step or a time section in q-hour step, where p and q are each a natural number.

Note that the condition information table 62 is not limited to including the three situational parameters illustrated in FIG. 6, but it is sufficient for the condition information table 62 to include one or more situational parameters. Similarly to the situational parameters illustrated in FIGS. 4 and 5, the situational parameters illustrated in FIG. 6 may include information used for grouping of situations of natural environment and for grouping of situations of social environment.

Referring back to FIG. 3, the description of the memory unit 10 will be continued. The model information storing unit 13 of the memory unit 10 stores model information. FIG. 7 is a diagram illustrating an example of model information stored in the model information storing unit 13. Model information 70 illustrated in FIG. 7 includes train model information 71 on each of the trains 6 that run in the DC-electrified section, substation model information 72 on each of the substations 3, and feed network model information 73.

The train model information 71 is information for controlling the amount of regenerative power reduction of each of the trains 6 that run in the DC-electrified section, and includes information on the regeneration reduction starting voltage value $V_{start}$ and information on the regeneration reduction termination voltage value $V_{end}$. Note that one or more of the multiple trains 6 that run in the DC-electrified section may be trains 6 that include no onboard devices having a wireless communication unit.

The substation model information 72 is information for controlling the substation voltages Vo of the respective substations 3, and includes the internal resistance and a controllable range Ro of the substation voltage Vo of each of the substations 3. The controllable range Ro is the range of the substation voltage Vo that the substation 3 can control. For example, a controllable range Ro ranging from 1450 V to 1550 V allows a voltage control unit 51 of the substation 3 to change the substation voltage Vo within a range from 1450 V to 1550 V.

The feed network model information 73 includes information such as location information on each of the substations 3, the conditions of connections between the overhead contact line and the substations 3, the conditions of connections between portions of the overhead contact line, and the length and the resistivity of the overhead contact line. Note that the overhead contact line is connected to the feeder line 5, and serves to transmit and receive power to and from a pantograph of the train 6.

Figures 8, 9:
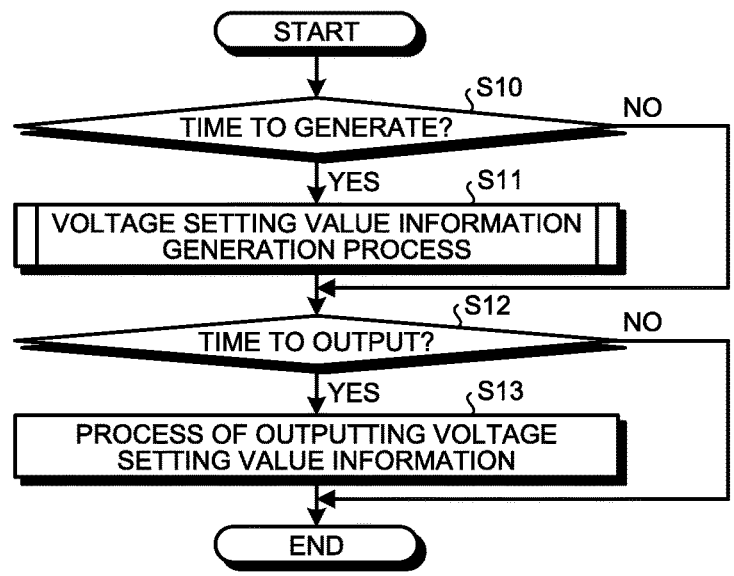
FIG. 8 is a diagram illustrating an example of voltage setting value information table according to the first embodiment.
FIG. 9 is a flowchart illustrating an example of DC feeder voltage computing process of the processing unit according to the first embodiment.

The voltage setting value storing unit 14 of the memory unit 10 stores the voltage setting values Vs1 to Vsn computed by the processing unit 20 in association with situational information. FIG. 8 is a diagram illustrating an example of voltage setting value information table stored in the voltage setting value storing unit 14.

A voltage setting value information table 63 illustrated in FIG. 8 contains information including "day type", "season", "time section", and "voltage setting value" information associated with one another. The "day type", "season", and "time section" columns of the voltage setting value information table 63 illustrated in FIG. 8 provide the same types of information respectively as the "day type", "season", and "time section" columns illustrated in FIG. 6. The "voltage setting value" information is information indicating the voltage setting values Vs1 to Vsn.

In the example illustrated in FIG. 8, the voltage setting value information indicating that the voltage setting values Vs1, Vs2, . . . , and Vsn are respectively 1500 V, 1510 V, . . . , and 1490 V is associated with a situation having a day type of weekday, a season of summer, and a time section of from 0 o'clock to 1 o'clock. In addition, the voltage setting value information indicating that the voltage setting values Vs1, Vs2, . . . , and Vsn are respectively 1550 V, 1550 V, . . . , and 1540 V is associated with a situation having a day type of weekday, a season of summer, and a time section of from 23 o'clock to 24 o'clock.

Similarly, the voltage setting value information table 63 illustrated in FIG. 8 also contains sets of voltage setting value information each indicating the voltage setting values Vs1 to Vsn, respectively associated with a situation of 0 o'clock to 1 o'clock on a winter weekday, a situation of 23 o'clock to 24 o'clock on a winter weekday, and a situation of 0 o'clock to 1 o'clock on a summer holiday.

Referring back to FIG. 3, the processing unit 20 of the DC feeder voltage computing device 1 will be now described. As illustrated in FIG. 3, the processing unit 20 includes an information acquisition unit 21, a voltage setting value computing unit 22, and a voltage setting value output unit 23.

The information acquisition unit 21 exchanges information with an onboard device (not illustrated) having a wireless communication unit, disposed on the train 6, via the communication unit 30 to acquire train information from the onboard device on the train 6, and sets the acquired train information in the run history information table 61 as the run history information.

Note that the information acquisition unit 21 can set, in the run history information table 61, situational information indicating the situation upon acquisition of the train information in association with the run history information on the train 6. The situational information indicating the situation upon acquisition of the train information includes the foregoing situational information indicating a running situation of the train 6.

Note that the processing of the information acquisition unit 21 is not limited to directly setting, without further processing, the train information acquired from the onboard device of the train 6 in the run history information table 61 as the run history information. The information acquisition unit 21 can also perform statistical processing on the train information on the multiple trains 6, and then set a result of such statistical processing in the run history information table 61 as the run history information. For example, the information acquisition unit 21 can set, in the run history information table 61, run history information including an average value of multiple pieces of train information for the same or similar running situations of the multiple trains 6.

In the DC-electrified section, there may be a train 6 running that includes no onboard devices having a wireless communication unit. For example, a train 6 of another company including no onboard devices having a wireless communication unit may run through the DC-electrified section. A train 6 including no onboard devices having a wireless communication unit is hereinafter referred to as "non-wireless train 6".

In a case in which a non-wireless train 6 runs through the DC-electrified section as described above, the information acquisition unit 21 can acquire non-wireless train information including a record of departure and arrival times at a station of the non-wireless train 6, from an operation management system (not illustrated) via the communication unit 30.

The information acquisition unit 21 stores train model information on a non-wireless train 6. The train model information on a non-wireless train 6 includes first model information and second model information. The first model information is information for use in computation of the location and the power value of a non-wireless train 6 by means of running simulation, and includes, for example, information indicating the weight, motor characteristics, and auxiliary device characteristics of that non-wireless train 6. The second model information is information including information on the regeneration reduction starting voltage value $V_{start}$ and information on the regeneration reduction termination voltage value $V_{end}$ both on that non-wireless train 6.

The information acquisition unit 21 is capable of generating the run history information on a non-wireless train 6 on the basis of the train model information and the non-wireless train information on the non-wireless train 6. Similarly to the case of the run history information on the train 6 having a wireless communication unit, the run history information on a non-wireless train 6 includes information indicating the train ID, the direction, the location, and the power value of the non-wireless train 6 at each time of day.

In addition, similarly to the case of the run history information on the train 6 having a wireless communication unit, the information acquisition unit 21 is capable of setting the run history information on the non-wireless train 6 in the run history information table 61 in association with the situational information indicating the running situation of the non-wireless train 6.

The voltage setting value computing unit 22 computes the voltage setting values Vs1 to Vsn for controlling the substation voltages Vo1 to Von, on the basis of the run history information stored in the run history information storing unit 11 and the model information 70 stored in the model information storing unit 13. Such voltage setting value computing unit 22 includes a run history information extraction unit 31, a power consumption amount computing unit 32, a candidate voltage value modification unit 33, and a voltage setting value determination unit 34.

The run history information extraction unit 31 extracts the run history information from the history information storing unit 11 on the basis of the condition information stored in the condition information storing unit 12. The condition information is information indicating the situation for which the voltage setting values Vs1 to Vsn are to be computed (hereinafter referred to simply as "situation for computing the voltage setting values Vs1 to Vsn"). The run history information extraction unit 31 extracts, from the run history information storing unit 11, run history information associated with situational information indicating a situation that is identical or similar to the situation for computing the voltage setting values Vs1 to Vsn.

It is assumed here that the run history information table 61 is as illustrated in FIG. 4 and that the condition information table 62 is as illustrated in FIG. 6. In this case, the run history information extraction unit 31 extracts the run history information set forth in the run history information table 61 illustrated in FIG. 4 from the run history information storing unit 11, as the run history information on the multiple trains 6 in association with situational information indicating the situation having a day type of weekday, a season of summer, and a time section of from 0 o'clock to 1 o'clock.

Similarly, the run history information extraction unit 31 extracts, from the run history information storing unit 11, run history information on the multiple trains 6 in association with situational information indicating situations each having a day type of weekday, a season of summer, and a corresponding time section in one-hour step interval after 1 o'clock.

Alternatively, assume now that the run history information table 61 is as illustrated in FIG. 5 and that the condition information table 62 is as illustrated in FIG. 6. In this case, the run history information extraction unit 31 extracts, from the run history information storing unit 11, the run history information on each of the trains 6 associated with situational information on weekday and summer, including "location" and "power" information from 0 o'clock to 1 o'clock set forth in the run history information table 61.

Meanwhile, there may be a case in which the run history information storing unit 11 does not store run history information in association with situational information that is identical to the situational information that provides the situation for computing the voltage setting values Vs1 to Vsn. For example, there may be a case in which the run history information storing unit 11 does not store run history information in association with situational information indicating that the day of the week is Thursday, the season is summer, the time section is 22 o'clock, the weather is rainy, and a music event is being held.

The run history information extraction unit 31 is capable of extracting run history information associated with situational information indicating a situation identical or similar to the situation for computing, on the basis of a degree of agreement between the situational information that provides the situation for computing and the situational information in association with the run history information.

The run history information extraction unit 31 is capable of determining a degree of situational agreement Da, which is a degree of agreement between the situational information that provides the situation for computing and the situational information in association with the run history information, on the basis of the number of matched parameters among the multiple situational parameters included in the situational information. The run history information extraction unit 31 is capable of extracting run history information that results in a high degree of agreement with the situation for computing.

For example, assume that the multiple situational parameters that provide the situation for computing are multiple parameters respectively representing the day type, the season, the time section, the event, and the weather; and that the day type is "Friday", the season is "summer", the time section is "1 o'clock to 2 o'clock", the event is "music event", and the weather is "rainy".

If run history information exists that has situational information having a day type of "Friday", a season of "summer", a time section of "1 o'clock to 2 o'clock", an event of "music event", and a weather of "rainy", the run history information extraction unit 31 determines that the degree of situational agreement Da is 100%. Alternatively, if run history information exists that has situational information satisfying four of the conditions that the day type is "Friday", the season is "summer", the time section is "1 o'clock to 2 o'clock", the event is "music event", and the weather is "rainy", the run history information extraction unit 31 determines that the degree of situational agreement Da is 80%.

In a case in which there are two or more pieces of run history information having a highest degree of situational agreement Da, the run history information extraction unit 31 can extract the run history information on a date closest to the date for computing. Note that the term "date for computing" refers to the date when the substation voltages Vo1 to Von are actually controlled in the substations $3_1$ to $3_n$.

In addition, the run history information extraction unit 31 is also capable of extracting run history information having a high degree of agreement with the situation for computing and on the date closest to the date for computing. For example, the run history information extraction unit 31 is capable of extracting run history information on the basis of a degree of closeness Dn with respect to the date for computing and the degree of situational agreement Da. A run date of the train 6 in the run history information closer to the date for computing results in a higher degree of closeness Dn.

The run history information extraction unit 31 can extract run history information that provides a highest product of the degree of closeness Dn and the degree of situational agreement Da; a highest sum of the degree of closeness Dn and the degree of situational agreement Da; or a highest weighted sum or weighted product of the degree of closeness Dn and the degree of situational agreement Da.

In addition, the run history information extraction unit 31 is capable of extracting run history information associated with situational information indicating a situation identical or similar to the situation for computing, on the basis of a deviation of a situational parameter. Such "deviation of a situational parameter" represents a degree of deviation between the content of a situational parameter that provides the situation for computing and the content of a situational parameter in association with the run history information. Such degree of deviation is presented by a numerical value.

For example, in a case in which the situational parameter is the day type, the deviation of the situational parameter can be "0" for the same day of the week, "1" for a day of the week differing by one day, and "2" for a day of the week differing by two days.

Alternatively, in a case in which the situational parameter is the time section, the deviation of the situational parameter can be "0" for the same time section, "1" for a time section differing by one hour, and "2" for a time section differing by two hours.

The run history information extraction unit 31 is also capable of extracting run history information associated with situational information indicating a situation identical or similar to the situation for computing the voltage setting values Vs1 to Vsn, on the basis of a sum Di that is a weighted sum of deviations of multiple respective situational parameters.

Assume that the situational parameters are parameters representing the day type, the season, the time section, and the weather, and the deviations of these four situational parameters are respectively denoted by Df1 to Df4. Given this assumption, the run history information extraction unit 31 can compute the sum Di by, for example, the operation of Formula (1) below:

$$Di = k1 \times Df1 + k2 \times Df2 + k3 \times Df3 + k4 \times Df4 \tag{1}$$

In Formula (1) above, k1 to k4 are each a factor k representing the weight value. A higher factor k is given for the deviation of a situational parameter having higher relevance to the situation for computing. For example, a higher factor k can be given to the deviation of a situational parameter representing the day type such as the day of the week and to the deviation of a situational parameter representing the time section than the other factors k.

The run history information extraction unit 31 can extract, from the run history information storing unit 11, run history information that provides a highest value of the sum Di computed by the operation of Formula (1) above. This enables the run history information to be extracted taking into account the effectiveness on the computation of the amount of power consumption.

As described above, the run history information extraction unit 31 is capable of extracting run history information associated with situational information indicating a situation that is identical or similar to the situation for computing the voltage setting values Vs1 to Vsn.

The power consumption amount computing unit 32 illustrated in FIG. 3 will next be described. The power consumption amount computing unit 32 performs a power simulation for the DC-electrified section on the basis of the run history information extracted by the run history information extraction unit 31, the model information 70, and candidate voltage values Vc1 to Vcn. By such power simulation, a total power consumption amount P is computed, which is the amount of the total power consumption in the DC-electrified section during the time section for which the computation is performed (hereinafter referred to simply as "time section for computing").

The candidate voltage values Vc1 to Vcn described above are candidate values for the substation voltages Vo1 to Von, and are set by the candidate voltage value modification unit 33 as described later herein. The run history information extracted by the run history information extraction unit 31 is run history information extracted on the basis of the condition information. The condition information includes the time section for computing as a situation for computing. In addition, the run history information extracted by the run history information extraction unit 31 includes run history information at times of day in the time section for computing.

The power consumption amount computing unit 32 computes the total power consumption Pp, which is the value of power consumption in the DC-electrified section resulting from power simulations for times of day in the time section for computing, on the basis of the run history information at times of day in the time section for computing, the model information 70, and the candidate voltage values Vc1 to Vcn.

The power consumption amount computing unit 32 computes the total power consumption amount P in the time section for computing by summing up the total power consumptions Pp resulting from the power simulation at the times of day in the time section for computing.

For example, if the run history information for each time of day is stored in the run history information storing unit 11, the power consumption amount computing unit 32 computes the total power consumption Pp on the basis of the run history information at each time of day. For the time section for computing for one hour from 0 o'clock to 1 o'clock, the power consumption amount computing unit 32 sums up the total power consumptions Pp for that one hour to compute the total power consumption amount P.

Note that, as described above, the model information 70 includes the train model information 71 on each of the trains 6, the substation model information 72 on each of the substations 3, and the feed network model information 73. The power consumption amount computing unit 32 computes the regenerative power of a regenerative train and the power-running power of a power-running train that ran in the DC-electrified section during the time section for computing; the power consumption in the feed network including the feeder line 5 and the overhead contact line; and the power consumptions of the respective substations 3, on the basis of the candidate voltage values Vc1 to Vcn and the model information 70.

The power consumption amount computing unit 32 computes the total power consumption Pp at each time of day by summing up the regenerative power of the regenerative trains, the power-running power of the power-running trains, the power consumption in the feed network, and the power consumptions of the respective substations 3. The regenerative power of a regenerative train is a negative value. The power-running power of a power-running train, the power consumption in the feed network, and the power consumptions of the respective substations 3 are each a positive value.

Note that the regenerable power and the regenerative power of a regenerative train have a relationship illustrated in FIG. 2. Accordingly, the power consumption amount computing unit 32 can compute the regenerative power of a regenerative train on the basis of the pantograph point voltage at the location of the regenerative train, the regeneration reduction starting voltage value $V_{start}$ of the regenerative train, the regeneration reduction termination voltage value $V_{end}$ of the regenerative train, and the regenerable power value of the regenerative train.

In addition, the power consumption amount computing unit 32 is capable of computing the power consumption in the feed network on the basis of the conditions of the current flowing through the feed network and the voltage applied to the feed network. The power consumption amount computing unit 32 is capable of estimating the conditions of the current flowing through the feed network and the voltage applied to the feed network on the basis of, for example, the locations and the regenerative power values of the respective regenerative trains, the locations and the power-running power values of the respective power-running trains, the location relationships among the regenerative trains, the power-running trains, and the substations 3, the conditions of connections between the overhead contact line and the substations 3, the conditions of connections between portions of the overhead contact line, and the resistivity of the overhead contact line. The power consumption amount computing unit 32 is capable of computing the power consumption in the feed network on the basis of the estimated conditions of the current flowing through the feed network and the voltage applied to the feed network.

In addition, the power consumption amount computing unit 32 is capable of computing the power consumptions in the respective substations 3 on the basis of the substation model information 72. The power consumption amount computing unit 32 estimates the current supplied from each of the substations 3 to the feed network, on the basis of the candidate voltage values Vc1 to Vcn, the regenerative power of the regenerative trains, the power-running power of the power-running trains, and the power consumption in the feed network. The power consumption amount computing unit 32 can compute the power consumption in each of the substations 3 on the basis of the current in that substation 3 estimated and the internal resistance of that substation 3.

As described above, the power consumption amount computing unit 32 is capable of computing the total power consumption amount P in the time section for computing on the basis of the candidate voltage values Vc1 to Vcn and the model information 70. Note that the total power consumption amount P may be computed using various computation methods, and the computation method is not limited to the method of the example described above.

The candidate voltage value modification unit 33 modifies the candidate voltage values Vc1 to Vcn to be set in the power consumption amount computing unit 32. The candidate voltage value modification unit 33 modifies the candidate voltage values Vc1 to Vcn to be set in the power consumption amount computing unit 32 using one modification mode that has been set, of a first modification mode, a second modification mode, and a third modification mode. The candidate voltage values Vc1 to Vcn may be hereinafter collectively or individually referred to as "candidate voltage value(s) Vc".

The first modification mode will first be described. The candidate voltage value modification unit 33 stores, in advance, a step width W. The step width W provides the difference between two closest candidate voltage values Vc. In a case of the modification mode being set to the first modification mode, the candidate voltage value modification unit 33 sequentially sets, as the candidate voltage value Vc, multiple values obtained by division of each of the controllable ranges Ro1 to Ron of the respective substation voltages Vo1 to Von by the step width W on the basis of the substation model information 72. Such first modification mode can be called a full search mode. The controllable ranges Ro1 to Ron are hereinafter collectively or individually referred to as "controllable range(s) Ro".

Assuming here that the step width W is 10 V and that the controllable range Ro is from 1450 V to 1550 V, division of the controllable range Ro of the substation voltage Vo by the step width W results in values of 1450 V, 1460 V, 1470 V, . . . , 1540 V, and 1550 V.

Assuming that the substations 3 are two substations $3_1$ and $3_2$, the candidate voltage values Vc1 and Vc2 are as follows: "Vc1, Vc2"∈{"1450, 1450", "1450, 1460", . . . , "1450, 1550", "1460, 1450", "1460, 1460", . . . , "1550, 1550"}.

That is, the voltage setting values "Vc1, Vc2" are modified in a 10-V step to generate 121 patterns of values, which are then set in the power consumption amount computing unit 32. Thus, in this case, the power consumption amount computing unit 32 computes the total power consumption amounts P respectively using the 121 patterns of "Vc1, Vc2" having different value sets.

The second modification mode will next be described. In a case of the modification mode being set to the second modification mode, the candidate voltage value modification unit 33 generates a predetermined number x of random numbers within the controllable range Ro of the substation voltage Vo of each of the substations 3 on the basis of the substation model information 72, and sequentially sets the generated x random numbers as the candidate voltage value Vc. Such second modification mode can be called a random number mode. Note that the parameter x is a natural number, and, for example, x=100.

Assume here that x=100, that the controllable range Ro is from 1450 V to 1550 V, and that the substations 3 are two substations $3_1$ and $3_2$. In this case, a pair of generated random numbers of "1451, 1549" will cause the candidate voltage value modification unit 33 to determine such that Vc1=1451 and Vc2=1549. In addition, a pair of next generated random numbers of "1537, 1482" will cause the candidate voltage value modification unit 33 to determine such that Vc1=1537 and Vc2=1482. As described above, the candidate voltage value modification unit 33 is capable of sequentially setting the generated x random numbers as the candidate voltage value Vc.

Note that the number x of random numbers may be less than 100 or greater than 100. In addition, in contrast to the above random numbers each having a value within the controllable range Ro, the candidate voltage value modification unit 33 is also capable of determining the above step width W using a random number. In this case, multiple values obtained by division of the controllable range Ro in a step width W determined using the random number may sequentially be set as the candidate voltage value Vc.

The third modification mode will next be described. The candidate voltage value modification unit 33 stores, in advance, a voltage setting value Vx and a step width Wx for each of the substations 3. Note that the voltage setting value Vx is a value within the controllable range Ro.

In a case of the modification mode being set to the third modification mode, the candidate voltage value modification unit 33 sequentially modifies the candidate voltage value Vc within a setting range Rx, which ranges in the step width Wx with respect to the voltage setting value Vx, while changing the voltage setting value Vx.

Specifically, the candidate voltage value modification unit 33 sequentially sets, as the candidate voltage value Vc, multiple values obtained by modification of the voltage setting value Vx by the step width Wx on the basis of the substation model information 72 and the voltage setting value Vx and the step width Wx for each of the substations 3. Such third modification mode can be called a local search mode.

Assume here that Vx=1500 V, that Wx=10 V, and that the substations 3 are two substations $3_1$ and $3_2$. In this case, the candidate voltage values Vc1 and Vc2 set by the candidate voltage value modification unit 33 in the power consumption amount computing unit 32 are "Vc1, Vc2"∈{"1490, 1500", "1510, 1500", "1500, 1490", "1500, 1510"}.

The candidate voltage value modification unit 33 determines the candidate voltage values Vc1 and Vc2 used in the computation that have led to the lowest value of the multiple total power consumption amounts P computed by the power consumption amount computing unit 32 using respective sets of the candidate voltage values Vc generated by modification of the voltage setting value Vx by the step width Wx.

Assume here that the candidate voltage values Vc1 and Vc2 used in the computation that have led to the lowest value of the multiple total power consumption amounts P are 1510 V and 1500 V. In this case, the voltage setting value Vx is 1510 V for the substation $3_1$ and is 1500 V for the substation $3_2$.

The candidate voltage values Vc1 and Vc2 set by the candidate voltage value modification unit 33 in the power consumption amount computing unit 32 are "Vc1, Vc2"∈{"1500, 1500", "1520, 1500", "1510, 1500", "1500, 1510"}. Thus, the candidate voltage value modification unit 33 modifies the newly set voltage setting value Vx by the step width Wx.

The candidate voltage value modification unit 33 determines the candidate voltage values Vc1 and Vc2 used in the computation that have led to the lowest value of the total power consumption amounts P computed by the power consumption amount computing unit 32 using respective sets of the candidate voltage values Vc generated by modification of the newly set voltage setting value Vx by the step width Wx. The candidate voltage value modification unit 33 repeats such operation a predetermined number of times to modify the voltage setting value Vx the predetermined number of times.

The voltage setting value determination unit 34 will next be described. The voltage setting value determination unit 34 determines, as the voltage setting value Vs to be output to a corresponding one of the substations 3, the candidate voltage value Vc that has been used in the computation of the total power consumption amount P that satisfies a preset power requirement among multiple total power consumption amounts P computed using multiple respective values of the candidate voltage value Vc obtained by modification by the candidate voltage value modification unit 33.

Use, as the power requirement, of a condition of being the lowest total power consumption amount P among the total power consumption amounts P can increase the regenerative power of a regenerative train present in the DC-electrified section and can thus reduce the amount of power consumption in the DC-electrified section.

For example, the voltage setting value determination unit 34 is capable of determining, as the voltage setting value Vs of each of the substations 3, the candidate voltage value Vc that has been used in the computation of the lowest total power consumption amount P among the multiple total power consumption amounts P computed by the power consumption amount computing unit 32.

Note that the above power requirement is not limited to the total power consumption amount P having the lowest value. For example, the voltage setting value determination unit 34 can use a condition of having the lowest variation among the multiple total power consumption amounts P as the power requirement. The phrase "having the lowest variation" as uses herein refers to a situation of a low change rate or a low amount of variation over time of the total power consumption Pp used in the computation of the total power consumption amount P.

In addition, the voltage setting value determination unit 34 can use a condition for the total power consumption amount P having both the lowest value and the lowest variation, as the power requirement. In a case in which there are multiple lowest total power consumption amounts P in the multiple total power consumption amounts P computed by the power consumption amount computing unit 32, the voltage setting value determination unit 34 can determine, as the voltage setting value Vs of each of the substations 3, the candidate voltage value Vc used in the computation of the total power consumption amount P having the lowest variation among the lowest total power consumption amounts P.

After determination of the voltage setting value Vs of each of the substations 3, the voltage setting value determination unit 34 stores voltage setting value information that associates situational information with the voltage setting values Vs of the respective substations 3, in the voltage setting value storing unit 14. The voltage setting value determination unit 34 stores the voltage setting value information in the voltage setting value storing unit 14 by setting voltage setting value information in the voltage setting value information table 63 stored in the voltage setting value storing unit 14. The voltage setting value determination unit 34 is capable of generating the voltage setting value information and of storing the voltage setting value information in the voltage setting value storing unit 14, for example, on or before the day preceding the day of control of the substation voltages Vo.

The voltage setting value output unit 23 outputs the voltage setting value information stored in the voltage setting value storing unit 14 to the DC feeder voltage control device 2. For example, the voltage setting value output unit 23 is capable of extracting voltage setting value information corresponding to the situation of the target to be controlled by the DC feeder voltage control device 2, from the voltage setting value information stored in the voltage setting value storing unit 14, and of outputting the extracted voltage setting value information to the DC feeder voltage control device 2.

Assume here that the voltage setting value information table 63 is as illustrated in FIG. 8 and that the situation of the target to be controlled has a day type of weekday, a season of summer, and a time section of from 0 o'clock to 1 o'clock. In this case, the voltage setting value output unit 23 extracts voltage setting value information indicating the voltage setting values Vs1, Vs2, . . . , and Vsn respectively of 1500 V, 1510, . . . , and 1490 V from the voltage setting value storing unit 14, and outputs this voltage setting value information to the DC feeder voltage control device 2.

Further assume that the situation of the target to be controlled has a day type of weekday, a season of winter, and a time section of from 23 o'clock to 24 o'clock. In this case, the voltage setting value output unit 23 extracts voltage setting value information indicating the voltage setting values Vs1, Vs2, . . . , and Vsn respectively of 1570 V, 1570, . . . , and 1550 V from the voltage setting value storing unit 14, and outputs this voltage setting value information to the DC feeder voltage control device 2.

Note that the voltage setting value output unit 23 extracts the voltage setting value information for the situation of the target to be controlled, from the voltage setting value storing unit 14, and outputs this voltage setting value information to the DC feeder voltage control device 2 immediately before a change to the situation of the target to be controlled by the DC feeder voltage control device 2. This operation enables the DC feeder voltage control device 2 to control the substation voltages Vo1 to Von on the basis of the voltage setting value information corresponding to the situation of the target to be controlled.

For example, in a case of a situation of the target to be controlled having a time section of from 0 o'clock to 1 o'clock, the voltage setting value output unit 23 extracts the voltage setting value information for the situation having a time section of from 0 o'clock to 1 o'clock from the voltage setting value storing unit 14, and outputs this voltage setting value information to the DC feeder voltage control device 2, before midnight (0 o'clock).

Although the example described above has been described in which the voltage setting value computing unit 22 generates, in advance, the voltage setting value information for each situation and stores the voltage setting value information in the voltage setting value storing unit 14, the present invention is not limited to such example. The voltage setting value computing unit 22 is also capable of generating the voltage setting value information corresponding to the situation of the target to be controlled immediately before a change to the situation of the target to be controlled, on the basis of information stored in the memory unit 10.

Note that the candidate voltage value modification unit 33 is also capable of modifying the candidate voltage values Vc1 to Vcn to be set in the power consumption amount computing unit 32 using a fourth modification mode, alternatively to the first modification mode, the second modification mode, and the third modification mode.

In a case of the modification mode being set to the fourth modification mode, the candidate voltage value modification unit 33 sequentially sets, as the candidate voltage value Vc, multiple values obtained by division of the controllable range Ro of the substation voltage Vo of each of the substations 3 by the step width W on the basis of the substation model information 72. The candidate voltage value modification unit 33 sequentially modifies the candidate voltage value Vc while reducing the step width W.

Specifically, the candidate voltage value modification unit 33 sequentially sets, as the candidate voltage value Vc, multiple values obtained by division of the controllable range Ro of the substation voltage Vo by a step width W1, in the power consumption amount computing unit 32. The candidate voltage value modification unit 33 then determines a range R1 including the candidate voltage value Vc that has been used in the computation of the lowest total power consumption amount P among the total power consumption amounts P computed by the power consumption amount computing unit 32 using respective values of the candidate voltage value Vc generated by division of the controllable range Ro by the step width W1. Denoting by Vcm the candidate voltage value Vc that has been used in the computation of the lowest total power consumption amount P, the range R1 is, for example, a range from Vcm−W1 to Vcm+W1.

The candidate voltage value modification unit 33 sequentially sets, as the candidate voltage value Vc, multiple values obtained by division of the range R1 by a step width W2 smaller than the step width W1, in the power consumption amount computing unit 32. The candidate voltage value modification unit 33 determines a range R2 including the candidate voltage value Vc that has been used in the computation of the lowest total power consumption amount P among the total power consumption amounts P computed by the power consumption amount computing unit 32 using respective values of the candidate voltage value Vc generated by division by the step width W2.

As described above, by reducing the step width W on the basis of the total power consumption amounts P computed by the power consumption amount computing unit 32, the candidate voltage value modification unit 33 reduces the searching ranges of the respective candidate voltage values Vc that lead to a low total power consumption amount P among the total power consumption amounts P computed by the power consumption amount computing unit 32. This enables the set of candidate voltage values Vc that leads to a low total power consumption amount P to be detected in a shorter time than when a small step width W is used from the beginning.

Although the example described above has been described in which the candidate voltage value modification unit 33 modifies the candidate voltage values Vc1 to Vcn to be set in the power consumption amount computing unit 32 on the basis of the preset modification mode, the modification mode can also be changed automatically. The candidate voltage value modification unit 33 is capable of determining the modification mode on the basis of a degree of agreement between the situational information in association with the run history information extracted by the run history information storing unit 11 and the situational information indicating the situation for computing the voltage setting values Vs (e.g., on the basis of the sum Di).

An operation of the processing unit 20 in the DC feeder voltage computing device 1 will next be described with reference to a flowchart. FIG. 9 is a flowchart illustrating an example of DC feeder voltage computing process of the processing unit 20 according to the first embodiment.

As illustrated in FIG. 9, the processing unit 20 determines whether it is time to generate voltage setting value information (step S10). Such time is a time before the substation voltages Vo1 to Von are controlled by a substation voltage control unit 41 of the DC feeder voltage control device 2.

Upon determination that it is time to generate voltage setting value information (step S10: Yes), the processing unit 20 performs a process of generating voltage setting value information (step S11). Such process of generating voltage setting value information is the process illustrated in steps S20 to S30 illustrated in FIG. 10, which will be described later in detail.

Upon termination of the processing at step S11 or upon determination that it is not time to generate voltage setting value information (step S10: No), the processing unit 20 determines whether it is time to output the voltage setting value information (step S12).

Upon determination that it is time to output the voltage setting value information (step S12: Yes), the processing unit 20 performs a process of outputting the voltage setting value information (step S13). At step S13, the voltage setting value output unit 23 of the processing unit 20 outputs the voltage setting value information stored in the memory unit 10 to the DC feeder voltage control device 2.

Upon termination of the processing at step S13 or upon determination that it is not time to output the voltage setting value information (step S12: No), the processing unit 20 terminates the process illustrated in FIG. 9.

Figure 10:
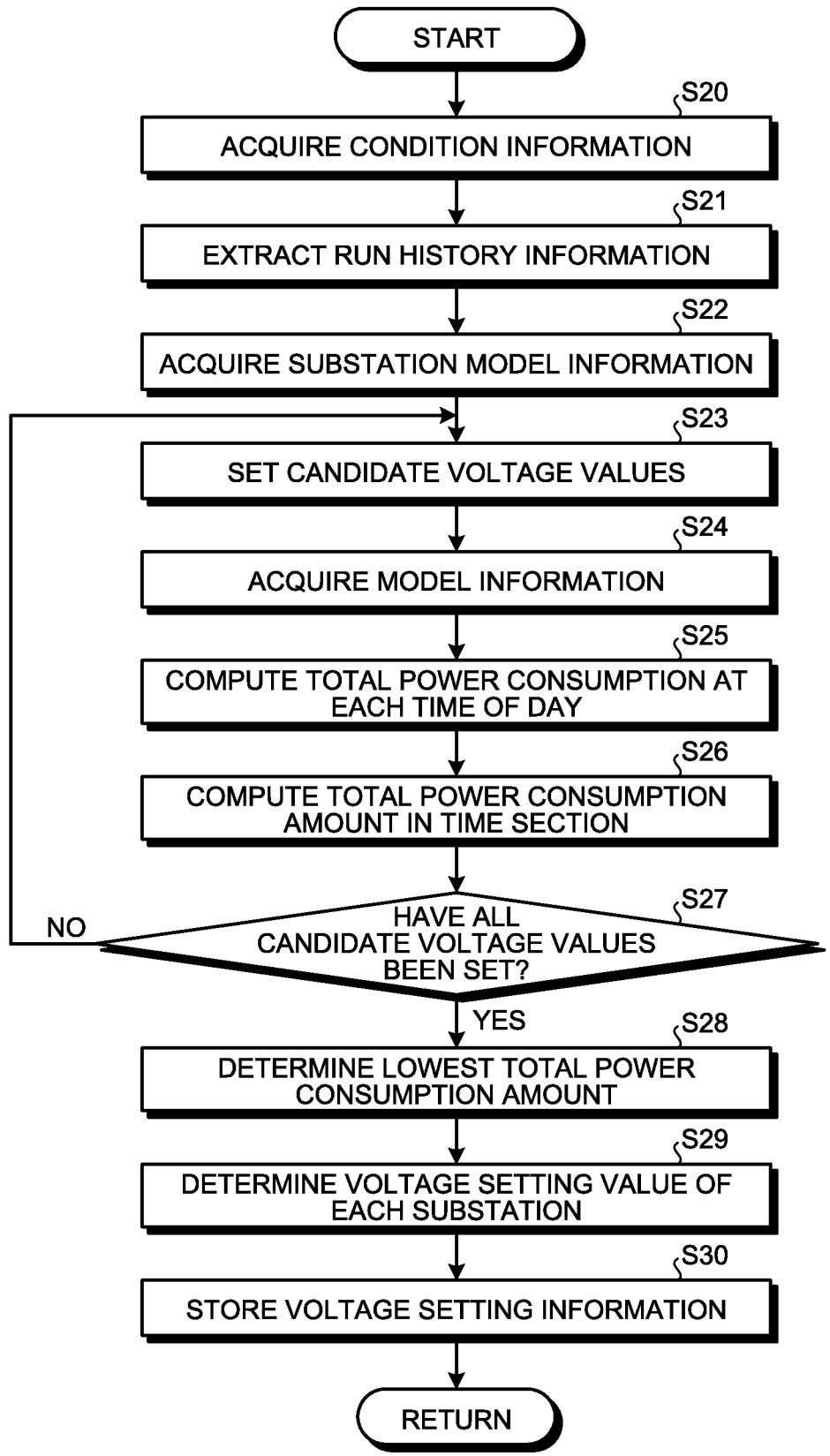
FIG. 10 is a flowchart illustrating an example of process of generating voltage setting value information according to the first embodiment.

FIG. 10 is a flowchart illustrating an example of the process of generating the voltage setting value information. The run history information extraction unit 31 of the processing unit 20 acquires condition information stored in the condition information storing unit 12 (step S20). The run history information extraction unit 31 extracts run history information from the run history information storing unit 11 on the basis of the condition information acquired at step S20 (step S21).

The candidate voltage value modification unit 33 of the processing unit 20 acquires the substation model information 72 on each of the substations 3 from the model information storing unit 13 (step S22). The candidate voltage value modification unit 33 sets, in the power consumption amount computing unit 32, the candidate voltage values Vc1 to Vcn of the respective substations 3 respectively in the controllable ranges Ro1 to Ron of the respective substations 3 on the basis of the substation model information 72 on the substations 3 (step S23).

The power consumption amount computing unit 32 acquires the model information 70 from the model information storing unit 13 (step S24). The power consumption amount computing unit 32 computes values of total power consumption Pp at times of day in the time section for computing, on the basis of the run history information acquired at step S21, the candidate voltage values Vc1 to Vcn of the respective substations 3 set at step S23, and the model information 70 acquired at step S24 (step S25).

The power consumption amount computing unit 32 sums up the values of the total power consumption Pp at the respective times of day to compute the total power consumption amount P in the time section for computing (step S26). The voltage setting value determination unit 34 determines whether the candidate voltage value modification unit 33 has set all the candidate voltage values Vc in the power consumption amount computing unit 32 (step S27).

Upon determination that not all candidate voltage values Vc have yet been set (step S27: No), the voltage setting value determination unit 34 advances the process to step S23. Otherwise, upon determination that all the candidate voltage values Vc have been set (step S27: Yes), the voltage setting value determination unit 34 determines the lowest total power consumption amount P among the multiple total power consumption amounts P computed by the power consumption amount computing unit 32 (step S28).

The voltage setting value determination unit 34 determines, as the voltage setting value Vs of each of the substations 3, the candidate voltage value Vc of each of the substations 3 that has been used in the computation of the lowest total power consumption amount P determined at step S28 (step S29). The voltage setting value determination unit 34 stores voltage setting value information indicating the voltage setting value Vs of each of the substations 3 determined at step S29 in the voltage setting value storing unit 14 (step S30).

Figure 11:
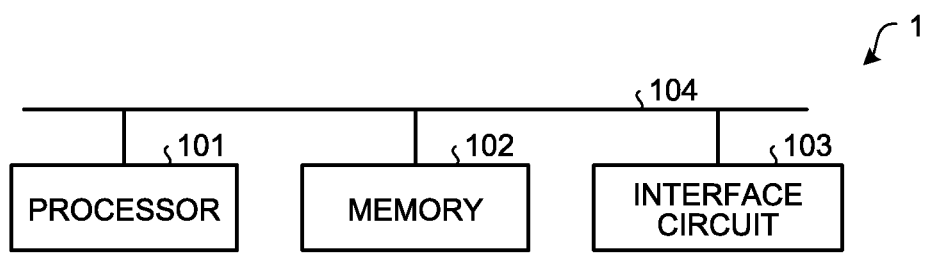
FIG. 11 is a diagram illustrating an example of hardware configuration of the DC feeder voltage computing device according to the first embodiment.

FIG. 11 is a diagram illustrating an example of hardware configuration of the DC feeder voltage computing device 1 according to the first embodiment. As illustrated in FIG. 11, the DC feeder voltage computing device 1 includes a processor 101, a memory 102, and an interface circuit 103.

The processor 101, the memory 102, and the interface circuit 103 can exchange data with one another through a bus 104. In the DC feeder voltage computing device 1, the run history information storing unit 11, the condition information storing unit 12, the model information storing unit 13, and the voltage setting value storing unit 14 are implemented in the memory 102. The communication unit 30 is implemented in the interface circuit 103. The memory 102 includes a program-recorded computer-readable recording medium.

The processor 101 reads and executes a DC feeder voltage computing program stored in the memory 102 to perform the functionality of the information acquisition unit 21, of the voltage setting value computing unit 22, and of the voltage setting value output unit 23. The processor 101 is one example of a processing circuit, and includes one or more of a central processing unit (CPU), a digital signal processor (DSP), and a system large scale integration (LSI).

The memory 102 is a non-volatile or volatile semiconductor memory such as a random access memory (RAM), a read-only memory (ROM), a flash memory, an erasable programmable read-only memory (EPROM), or an electrically erasable programmable read-only memory (EEPROM); a magnetic disk, a flexible disk, an optical disk, a compact disc, a MiniDisc, a digital versatile disc (DVD), or the like.

As described above, the DC feeder voltage control system 100 according to the first embodiment includes the DC feeder voltage computing device 1 and the DC feeder voltage control device 2. The DC feeder voltage computing device 1 computes the voltage setting values Vs1 to Vsn, which are setting values of the respective substation voltages Vo1 to Von, which are voltages respectively applied from the substations 3 to the feeder line 5 in the DC-electrified section of an electric railway system. The DC feeder voltage control device 2 controls the substation voltages Vo1 to Von of the respective substations 3 on the basis of the voltage setting values Vs1 to Vsn computed by the DC feeder voltage computing device 1. The DC feeder voltage computing device 1 includes the model information storing unit 13, the run history information storing unit 11, and the voltage setting value computing unit 22. The model information storing unit 13 stores the model information 70 including the train model information 71 including information for controlling the amount of regenerative power reduction in the train 6 present in the DC-electrified section, the feed network model information 73 including location information on the substations 3, and the substation model information 72 including control information on the substation voltages Vo. The run history information storing unit 11 stores, on a per train 6 basis, run history information that indicates locations and power situations of multiple trains 6 that ran in the DC-electrified section on or before the preceding day. The voltage setting value computing unit 22 computes, on the basis of the model information 70 and the run history information, the voltage setting values Vs for controlling the substation voltages Vo to cause the total power consumption amount P in the DC-electrified section to satisfy a power requirement that is a preset condition. This can prevent a loss caused by a control delay and can thus improve the energy-saving effect as compared to when train information is collected in real time to control the substation voltages Vo.

Furthermore, the run history information storing unit 11 stores situational information that is associated with the run history information and indicates running situations of the trains 6. The voltage setting value computing unit 22 extracts, from the run history information storing unit 11, run history information associated with situational information indicating a situation identical or similar to the situation for computing the voltage setting values Vs, and computes the voltage setting values Vs on the basis of the run history information extracted and the model information 70. This enables appropriate voltage setting values Vs to be computed depending on the running situation of the train 6, and thus enables the energy-saving effect to be further improved.

Furthermore, the DC feeder voltage control system 100 includes the condition information storing unit 12, which stores condition information that provides the situation for computing. The voltage setting value computing unit 22 extracts run history information associated with situational information identical or similar to the condition information stored in the condition information storing unit 12. Thus, storing condition information in advance in the DC feeder voltage control system 100 enables run history information dependent on the running situation of the train 6 to be readily extracted.

The condition information includes multiple situational parameters that provide the situation for computing, and the situational information includes multiple situational parameters that represent the running situations of the trains 6. The voltage setting value computing unit 22 extracts, from the run history information storing unit 11, the run history information associated with situational information indicating a situation identical or similar to the situation for computing the voltage setting values Vs, on the basis of the sum Di, which is a weighted sum of deviations of the situational parameters between the condition information and the situational information. This enables run history information suitable for the situation for computing the voltage setting values Vs1 to Vsn to be acquired and the voltage setting values Vs1 to Vsn to be computed with high accuracy.

Furthermore, the voltage setting value computing unit 22 includes the power consumption amount computing unit 32, the candidate voltage value modification unit 33, and the voltage setting value determination unit 34. The power consumption amount computing unit 32 computes the total power consumption amount P, which is the amount of power consumption in the DC-electrified section, on the basis of the run history information, the model information 70, and the candidate voltage values Vc, which are candidate values for the substation voltages. The candidate voltage value modification unit 33 modifies the candidate voltage values Vc for use in computation of the total power consumption amount P in the power consumption amount computing unit 32. The voltage setting value determination unit 34 determines, as the voltage setting value Vs to be output to a corresponding one of the substation 3, the candidate voltage value Vc that has been used in the computation of the total power consumption amount P that satisfies a power requirement among multiple total power consumption amounts P computed using multiple respective values of the candidate voltage value Vc obtained by modification by the candidate voltage value modification unit 33. Thus, modification of the candidate voltage value Vc enables a suitable voltage setting value Vs to be computed.

Furthermore, the candidate voltage value modification unit 33 sequentially sets, as the candidate voltage value Vc, values at intervals of the step width W, which is a setting interval, in each of the controllable ranges Ro of the respective substation voltages Vo, on the basis of the substation model information 72, which is the control information on the substation voltages Vo. Thus, appropriate setting of the step width W enables the voltage setting values Vs to be determined with high accuracy, and at the same time, the computation time of the total power consumption amount P to be appropriately managed by increasing or reducing the number of the candidate voltage values Vc to be set.

Furthermore, the candidate voltage value modification unit 33 generates multiple random numbers within a controllable range Ro of the substation voltage Vo on the basis of the substation model information 72, and sequentially sets the generated multiple random numbers as the candidate voltage value Vc. This enables the voltage setting values Vs to be determined with high accuracy by a reduced number of times of the power simulation by appropriately increasing or reducing the number of the random numbers.

Furthermore, the candidate voltage value modification unit 33 sequentially modifies the candidate voltage value Vc in a setting range Rx from a voltage setting value Vx while changing the voltage setting value Vx. Thus, the voltage setting values Vs can be determined with high accuracy by a reduced number of times of the power simulation.

Furthermore, the power consumption amount computing unit 32 sums up values of the total power consumption Pp in the DC-electrified section at respective times of day on the basis of the run history information, the model information 70, and the candidate voltage values Vc to compute the total power consumption amount P in the DC-electrified section for each time section of the day. This enables the voltage setting values Vs to be computed for each time section and thus the voltage setting values Vs to be computed on a per time section basis. This can reduce the processing burden on the processing unit 20 caused by the computation of the voltage setting values Vs.

Furthermore, the DC feeder voltage computing device 1 includes the voltage setting value storing unit 14 and the voltage setting value output unit 23. The voltage setting value storing unit 14 stores the voltage setting values Vs computed by the voltage setting value computing unit 22. The voltage setting value output unit 23 outputs the voltage setting values Vs stored in the voltage setting value storing unit 14. This enables each of the voltage setting values Vs dependent on the situation of controlling the corresponding one of the substation voltages Vo to be promptly output from the voltage setting value storing unit 14.

The configurations described in the foregoing embodiment are merely examples of various aspects of the present invention. These configurations may be combined with a known other technology, and moreover, a part of such configurations may be omitted and/or modified without departing from the spirit of the present invention.

REFERENCE SIGNS LIST

1 DC feeder voltage computing device; 2 DC feeder voltage control device; 3, $3_1$-$3_n$ substation; 4 network; 5 feeder line; 6, $6_1$-$6_m$ train; 10 memory unit; run history information storing unit; 12 condition information storing unit; 13 model information storing unit; 14 voltage setting value storing unit; 20 processing unit; 21 information acquisition unit; 22 voltage setting value computing unit; 23 voltage setting value output unit; 30 communication unit; 31 run history information extraction unit; 32 power consumption amount computing unit; 33 candidate voltage value modification unit; 34 voltage setting value determination unit; 61 run history information table; 62 condition information table; 63 voltage setting value information table; 70 model information; 71 train model information; 72 substation model information; 73 feed network model information; 100 DC feeder voltage control system.

The invention claimed is:

1. A direct current (DC) feeder voltage computing device for computing a substation voltage that is a voltage applied from a substation to a feeder line in a DC-electrified section of an electric railway system, the DC feeder voltage computing device comprising:
a model information storage to store model information including train model information including information for controlling an amount of regenerative power reduction in a train present in the DC-electrified section, feed network model information including location information on the substation, and substation model information including control information on the substation voltage;
a run history information storage to store, on a per train basis, run history information that indicates locations and power situations of a plurality of trains that run in the DC-electrified section on or before a preceding day; and
a voltage setting value calculator to compute, on a basis of the model information and the run history information, a voltage setting value for controlling the substation voltage to cause an amount of power consumption in the DC-electrified section to satisfy a preset condition.

2. The DC feeder voltage computing device according to claim 1, wherein
the run history information storage stores situational information in association with the run history information, and the situational information indicating a running situation of the train, and
the voltage setting value calculator extracts, from the run history information storage, run history information associated with situational information indicating a situation identical or similar to a situation for which the voltage setting value is to be computed and computes the voltage setting value on a basis of the extracted run history information and the model information.

3. The DC feeder voltage computing device according to claim 2, comprising:
a condition information storage to store condition information that provides the situation for which the voltage setting value is to be computed, wherein
the voltage setting value calculator extracts run history information associated with situational information identical or similar to the condition information stored in the condition information storage.

4. The DC feeder voltage computing device according to claim 3, wherein
the condition information includes a plurality of parameters that provide the situation for which the voltage setting value is to be computed,
the situational information includes a plurality of parameters that represent the running situation of the train, and
the voltage setting value calculator extracts the run history information associated with situational information indicating a situation identical or similar to the situation for which the voltage setting value is to be computed, on a basis of a weighted sum of deviations of the parameters between the condition information and the situational information.

5. The DC feeder voltage computing device according to claim 1, wherein
the voltage setting value calculator includes
a power consumption amount calculator to compute the amount of power consumption in the DC-electrified section on a basis of the run history information, the model information, and a candidate value for the substation voltage,
a candidate voltage value modifier to modify a plurality of times the candidate value for the substation voltage for use in computation of the amount of power consumption in the power consumption amount calculator, and
a voltage setting value determiner to determine, as the voltage setting value to be output to the substation, the candidate value that is used in computation of the amount of power consumption that satisfies the condition among a plurality of amounts of power consumption computed using multiple values of the candidate value obtained by modification by the candidate voltage value modifier.

6. The DC feeder voltage computing device according to claim 5, wherein
the candidate voltage value modifier sequentially sets, as the candidate value for the substation voltage, values at setting intervals in a controllable range of the substation voltage, on a basis of control information on the substation voltage.

7. The DC feeder voltage computing device according to claim 5, wherein
the candidate voltage value modifier generates a plurality of random numbers within a controllable range of the substation voltage on a basis of control information on the substation voltage, and sequentially sets the plurality of random numbers generated, as the candidate value for the substation voltage.

8. The DC feeder voltage computing device according to claim 5, wherein
the candidate voltage value modifier performs a process of sequentially modifying the candidate value for the substation voltage in a setting range with respect to a voltage setting value while changing the voltage setting value.

9. The DC feeder voltage computing device according to claim 5, wherein
the power consumption amount calculator sums up values of power consumption in the DC-electrified section at respective times of day on a basis of the run history information, the model information, and the candidate value for the substation voltage to compute the amount of power consumption in the DC-electrified section.

10. The DC feeder voltage computing device according to claim 1, comprising:
a voltage setting value storage to store the voltage setting value computed by the voltage setting value calculator; and
a voltage setting value transmitter to output the voltage setting value stored in the voltage setting value storage.

11. A DC feeder voltage control system comprising:
the DC feeder voltage computing device according to claim 1; and
a DC feeder voltage control device to control the substation voltage of the substation on a basis of the voltage setting value computed by the DC feeder voltage computing device.

12. A direct current (DC) feeder voltage computation method performed by a computer, the method comprising:
acquiring, from a model information storage storing model information, the model information including train model information including information for controlling an amount of regenerative power reduction in a train present in a DC-electrified section of an electric railway system, feed network model information including location information on a substation that applies a voltage to a feeder line in the DC-electrified section, and substation model information including control information on a substation voltage that is the voltage to the feeder line;
acquiring run history information that indicates locations and power situations of a plurality of trains that run in the DC-electrified section on or before a preceding day, from a run history information storing the run history information on a per train basis; and
computing, on a basis of the model information and the run history information, a voltage setting value for controlling the substation voltage to cause an amount of power consumption in the DC-electrified section to satisfy a preset condition, and outputting the voltage setting value to the substation.

* * * * *